Nov. 20, 1951  J. J. KRANTZ  2,575,921
DEVICE FOR PRODUCING FOOD PRODUCTS
Filed Aug. 29, 1946  4 Sheets-Sheet 1

INVENTOR.
JOHN J. KRANTZ
BY
ATTORNEY.

Nov. 20, 1951     J. J. KRANTZ     2,575,921
DEVICE FOR PRODUCING FOOD PRODUCTS
Filed Aug. 29, 1946     4 Sheets-Sheet 2

INVENTOR.
JOHN J. KRANTZ
BY Richmond S. Hayes
ATTORNEY.

Nov. 20, 1951 J. J. KRANTZ 2,575,921
DEVICE FOR PRODUCING FOOD PRODUCTS
Filed Aug. 29, 1946 4 Sheets-Sheet 3
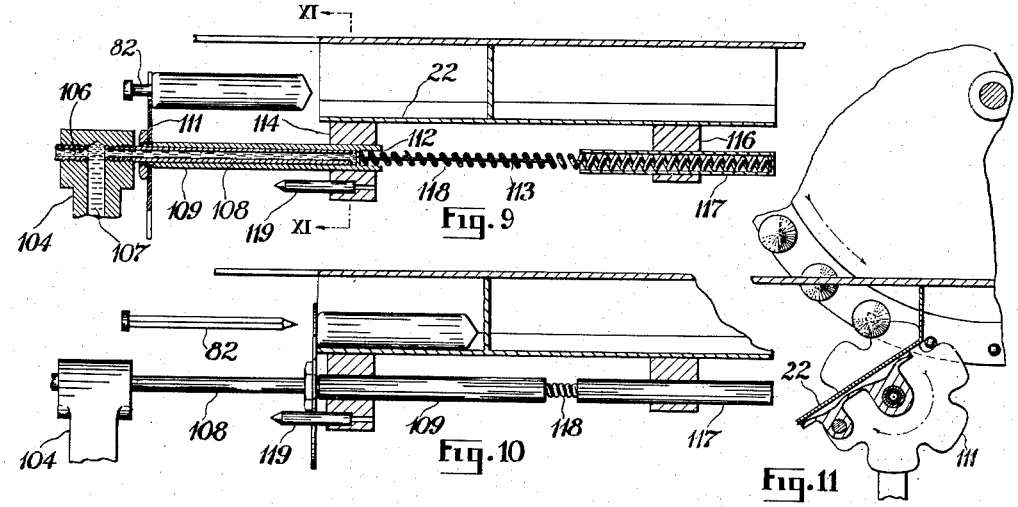
Fig. 9
Fig. 10
Fig. 11
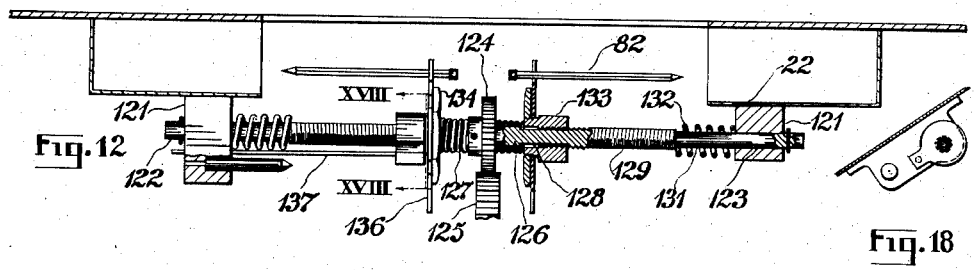
Fig. 12
Fig. 18
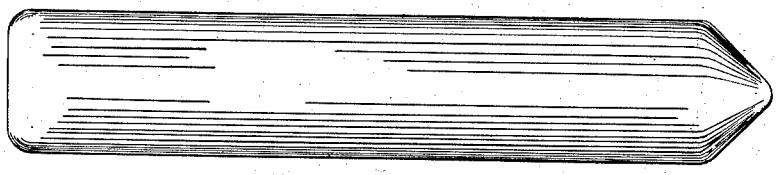
Fig. 13
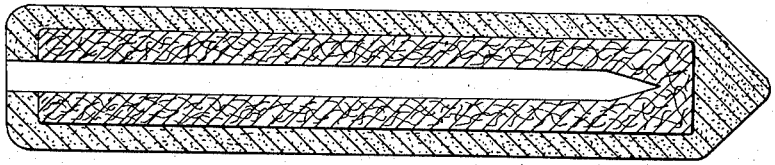
Fig. 14
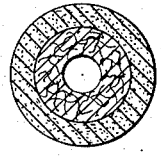
Fig. 15
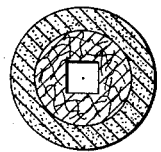
Fig. 16
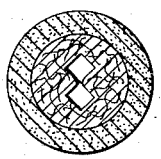
Fig. 17
INVENTOR
JOHN J. KRANTZ
BY
ATTORNEY Patented Nov. 20, 1951

2,575,921

UNITED STATES PATENT OFFICE 2,575,921

DEVICE FOR PRODUCING FOOD PRODUCTS

John J. Krantz, Bradford, Pa.

Application August 29, 1946, Serial No. 693,768

16 Claims. (Cl. 107—1)

1

This invention relates to an improved device for producing a food product, and is more particularly directed to a device capable of producing a food product that includes an edible filler and jacket.

In the illustrated form of the invention, the device discloses means for producing a food product of elongated form that includes a meat or other paste-like core and an enclosing jacket of suitable dough or the like. The device, in operation, functions to combine a paste core and dough jacket, cook these ingredients after such combination, and deliver the cooked product to the exterior of the device. The device is so designed as to produce processed food products of this nature in a continuous manner, the cycle of production depending, to some extent at least, on the particular food ingredients being processed and the extent of processing required.

A device of the class to which the present invention relates is intended primarily for use in the quantity production of food products under circumstances and in places which usually vend such products as soft drinks, hamburgers, etc. It is essential that such a device not only be capable of continuous operation, but that each product be properly processed, and the cost of production be such that a profit may be realized on the sale of the product. Several devices have heretofore been developed for this general purpose but have met with little or no commercial success by reason of their complicated structure, high cost of manufacture, susceptibility to breakdown, and general inability to produce, in quantity, a product equal or superior in taste and appearance to a comparable product produced in the customary manner.

It is therefore a particular object and advantage of the invention to provide a device for the continuous manufacturer and processing of a food product that consists of two or more suitably combined food ingredients.

It is also an important object of the invention to provide a device for the manufacture and processing of a food product that is of somewhat elongated form and includes a paste-like core, enclosed by a jacket, the product thus formed being processed or rendered edible by exposure to suitable heat.

Another and important object of the invention lies in the provision of a device that, through a process of extrusion, completely encloses a meat or other paste-like core within a jacket of dough or the like.

Additionally, it is an object of the invention to provide a device that is capable of continuous operation to produce edible jacketed food products through the process of, first, combining the ingredients in the desired form; second, cooking or otherwise rendering the product edible; and, third, dispensing the processed product.

Many other objects and advantages of the invention will be more fully understood and appreciated from a consideration of the following specification, taken in conjunction with the accompanying drawings; and in which Fig. 1 is a perspective view of a device embodying one form of the invention;

Fig. 5 is a view of one form of conveyor spit on which a food product is mounted;

Fig. 9 is an enlarged fragmentary vertical sectional view showing a mechanism by which a food product, when processed, may be removed from its carrying spit;

Fig. 10 is a view similar to Fig. 9, showing the food product completely removed from the spit, preparatory to discharge from the device;

Fig. 11 is a fragmentary view, partly in section, taken substantially as suggested by the line XI—XI of Fig. 9;

Fig. 12 illustrates a modified form, in duplicate, of the mechanism by which the stripping wheel may be actuated, certain parts being in section to better bring out the operative details;

Fig. 13 is an enlarged side elevational view of a food product as formed by the device;

Fig. 14 is a longitudinal sectional view through the product shown in Fig. 13;

Fig. 15 is a transverse cross sectional view of a product, showing the kind of lengthwise opening generally produced when the product is formed on a many-sided spit;

Fig. 16 is a cross sectional view of a product showing the theoretical shape of the opening left by the removal of a product from a square spit;

Fig. 17 is a cross sectional view of a product having a pair of centered, lengthwise openings formed upon the removal of the product from a spit of corresponding cross sectional contour;

Fig. 18 is a fragmentary view, partly in section, of a part of the modified stripping mechanism, being taken substantially on the line XVIII—XVIII of Fig. 12;

Figure 1:
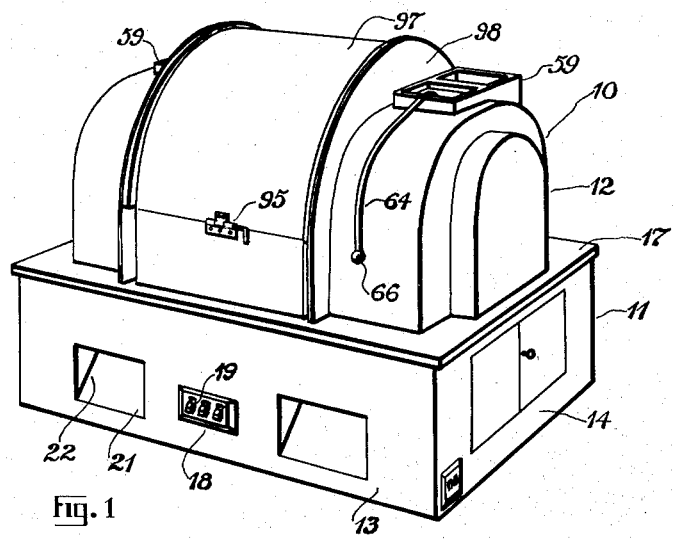

Referring more particularly to the drawings, the reference numeral 10 is employed to generally designate a device adapted to combine two or more food ingredients into a product and so process such product as to render it edible. The device illustrated provides duplicate extruding units, a combined but, nevertheless, duplicate spit conveyor, and duplicate strippers for removing the finished products from the spits. The device, as shown, is capable of combining a meat ingredient, in the form of a paste, with an uncooked dough, the combining being such that the meat constitutes a substantially full length core, and the dough, a completely enclosing wrapper or jacket. The device, for purposes of explanation, may be considered as consisting of a base 11, in which the driving and timing mechanisms are located, and a top 12 that includes the food ingredient containers, ingredient combining and extruding unit and food product conveyor.

The base 11 consists of a rectangular box having a front wall 13, end walls 14, and rear wall 16. This structure is closed by a suitable top 17 which also serves as a support for structure located thereabove. Centrally of the front wall 13 is a control panel 18. The switches 19 on this panel control operation of the various mechanisms of the device. On either side of the panel 18 are apertures 21 which give access to inclined chutes 22. These chutes constitute means by which finished food products are conveyed from the interior to the exterior of the device. Adjacent the rear of the base 11 is a transmission box 23. The various mechanisms contained within and adjacent this box, and utilized in the operation of the device, are standard, readily available parts and, for the most part, are shown only in diagrammatic form. However, the particular applicability of the various gears and cam structures to the operative steps of the mechanism of the device will be hereinafter more fully brought out. A source of power to drive the various mechanisms may be had through provision of an electric motor 24, located forwardly in the base 11 and operatively available through a belt 26 and pulley 27. This pulley is mounted exteriorly of the box 23 on a drive shaft 28.

Within the box 23, shaft 28 mounts a gear 29 that is in constant mesh with a gear 30 mounted on a shaft 31. A further gear 32, mounted on another shaft 33, meshes with gear 30. It will be understood that gears 29, 30, and 32 are merely suggestive of a reduction drive and that the actual reduction is required to be much greater. A further shaft 34 mounts a gear 36 which meshes with a small gear 37 mounted on shaft 33. Gear 37 is rendered operative with shaft 33 when a clutch 38 has been actuated. Externally of the box 23, an end of shaft 34 mounts a gear 39. As may be seen in Fig. 3 of the drawing, gear 39 meshes with a gear 41 located thereabove and a further gear 42 meshes with gear 41. Gears 41 and 42 are driven in opposite directions by the gear 39 which, as pointed out above, is operable when the clutch 38 has been actuated.

Also within the base 11 is a unit for the extrusion of at least two food ingredients in a manner to be combined into a single food product. This structure takes the form of a container 43 which consists of side walls 44, end wall 45, and bottom wall 46. A vertical partition 47 divides the container into two separate compartments. Projecting through the end wall 45, into one of the compartments, is a shaft 48 on which is formed or mounted a spiral blade 49. It will be noted that this shaft mounts gear 41. In the other compartment, a tubular shaft 51 mounts or is formed with a spiral blade 52. This shaft, exteriorly of the container, mounts gear 42. Projecting through the shaft 51 is a push rod 53, one end of which terminates in a plunger 54. As may be seen in Figs. 4, 7, and 8 of the drawing, one end of the container 43 is formed with a head 56 which communicates with both compartments and provides a small aperture 57, or nozzle, through which the ingredients from both compartments are adapted to pass to the container exterior. This head also includes a nozzle 58 for the compartment which requires the food ingredient contained therein to be extruded in a manner to be enclosed or encased by the ingredient simultaneously being extruded from the other compartment. Mounted on top of the container 43, substantially as suggested in Fig. 4 of the drawing, is a hopper 59, having compartments 61 and 62 which register with the compartments of the container. Any suitable means may be employed to cause the material within the hopper to feed onto the spiral blades, such as a block 63, having an attached cable 64 and knob 66. As may be seen in Fig. 1, when the hopper is encased, as shown, the cables and knobs may serve, by their position, as an indication of the amount of material remaining in the compartments.

Figure 4:
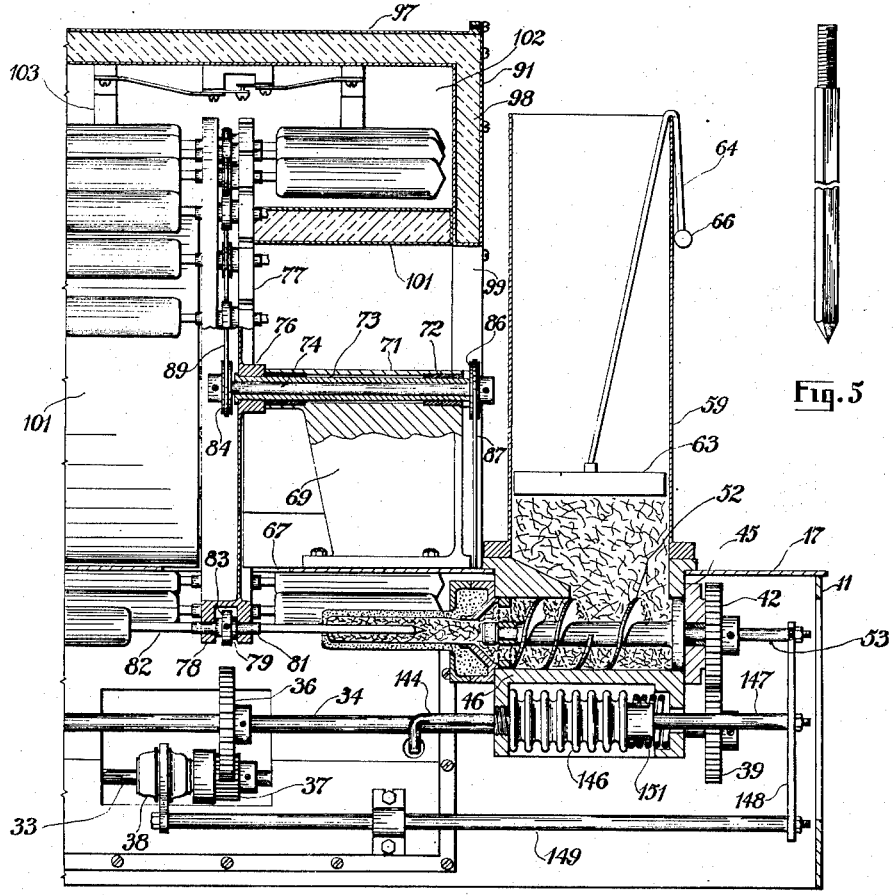
Fig. 4 is an enlarged vertical fragmentary sectional view showing certain details of the product conveyor and food ingredient extrusion unit.
Figure 19:
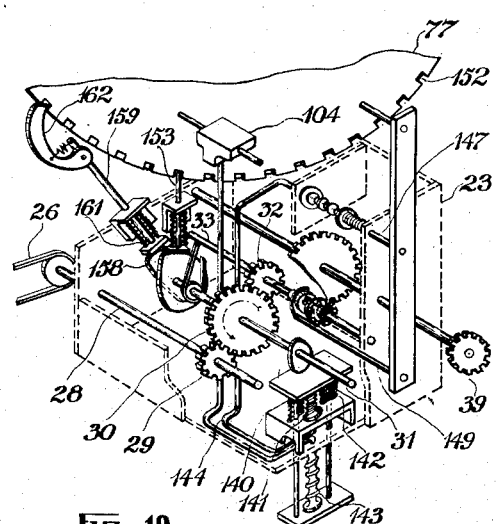
Fig. 19 is a diagrammatic perspective view of the operating mechanisms of the device and the position of the parts thereof during the period of combining ingredients into product form, substantially as suggested in Fig. 4.

The top wall 17 of the base 11 is formed with a slot or aperture 67 which connects with right angle slots 68. This entire structure produces a somewhat H-shaped opening in the wall 17, as viewed in Fig. 2 of the drawing. Adjacent the opening 67, an upstanding support 69 is permanently mounted. The upper end of this support terminates in a tubular portion 71, in which suitable bearings 72 serve to mount a rotatable sleeve 73. One end of this sleeve extends beyond the portion 71 of the support to vertically overlie the opening 67. Projecting through the sleeve 73 is a shaft 74. The extended end of the sleeve 73 fixedly mounts the hub 76 of a spit wheel 77. The diameter of this wheel is such that it extends through the opening 67 of the wall 17 into the base 11. The rim of the wheel, as may be seen in Fig. 4, is formed with a pair of spaced flanges 78 that provide a radially, outwardly opening, circumferential channel 79. The flanges 78 are formed with a plurality of uniformly spaced, aligned apertures, in each of which is located a sleeve 81. The ends of these sleeves, extending laterally away from the flanges 78, are recessed and receive and secure, either by threaded engagement or the interfitting of angular parts, the corresponding ends of a series of spits 82. The corresponding ends of sleeves 81, located within the channel 79, are secured in any suitable manner to a sprocket wheel or pulley 83. Rotation of each of these wheels or pulleys rotates a pair of co-axial spits. Since the wheel 77 is intended to carry two sets of opposed spits on the circumferential flanges 78, it will be evident that the wall 17 must include the added openings 68 to permit passage of the spits into the base 11. One end of the shaft 74 extends beyond the hub 76 of the wheel 77 and is fitted with a pulley 84. The other end of this shaft extends beyond the supporting sleeve and has fixed thereto a further pulley 86. A belt 87 connects this pulley with a pulley 88 mounted on shaft 31 of the drive mechanism (see Figs. 3 and 19). An endless belt 89 transmits the driving motion of pulley 84 to all of the spit pulleys 83 in the manner suggested in Fig. 3 of the drawing. It is pointed out that since shafts 28 and 31 are continuously rotating during operation of the machine, pulleys 83 and, consequently spits 82, will also continuously rotate.

Figures 2, 3:
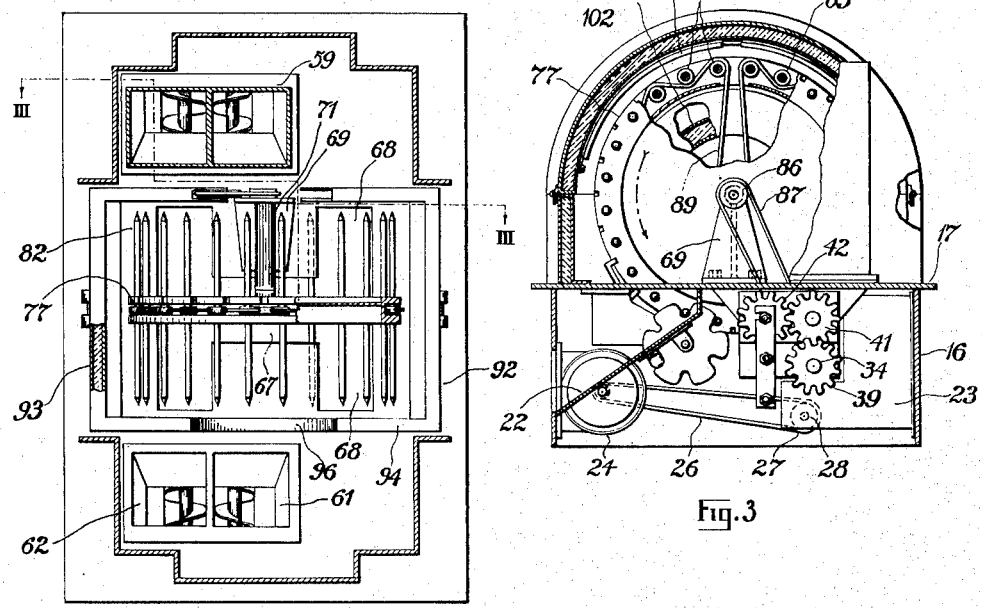
Fig. 2 is a top plan view, partly in section, with the central cover removed, and shows one arrangement for feeding ingredients to duplicate product conveyors.
Fig. 3 is a vertical sectional view, taken substantially as suggested by the line III—III of Fig. 2.

In the present disclosure it is contemplated that, after combining two or more food ingredients into a product, the product be thermally processed. To this end, the split wheel 77 and spits 82 are encased in an insulated structure 91 that may serve as refrigerator or cooking oven. Since the product described is to be cooked, the structure 91 will serve as an oven and comprises fixed and removable parts. As shown in Fig. 2, the fixed part of the oven consists of front and rear walls 92 and 93, connected by side walls 94. The side walls are formed with semi-circular recessed areas 96. The removable part of the oven consists of a semi-circular cover 97, the sides 98 of which are cut away, as at 99, to form a semi-circular opening that, when the cover is closed, matches the openings 96 of the fixed portion. As indicated, the cover may be hinged to the rear wall 93 and provided with a releasable fastener 95 to secure it to the front wall 92. An interior oven wall is indicated in Figs. 3 and 4 of the drawing and consists of a circular member 101, the ends of which approach the side walls 94 of the fixed portion and the side walls 98 of the cover. The size of this interior oven wall is such that it provides, with the other walls, a cooking area 102. The oven walls are of suitable insulating material and are principally intended to provide an area in which suitable heating elements 103 may operate efficiently to cook the product during its travel on the spit wheel from the point of manufacture to the point of removal.

In Figs. 9 to 11, one form of mechanism is shown for removing or stripping the cooked product from its supporting spit. This mechanism includes a fixed bracket 104 having a pair of opposed lateral openings 106 that connect with a further opening 107. Each opening 106 is adapted to receive one end of a tube 108. Mounted for slidable movement on this tube is a sleeve 109. At one end, sleeve 109 mounts a freely rotatable star wheel 111, and at its other end is closed and formed with a recess 112 from which projects a guide rod 113. The closed end of the sleeve 109 projects into and is adapted to slide through a supporting bracket 114. A further bracket 116 mounts and secures a closed end tubular member 117. A compression spring 118 is mounted on the rod 113, one end thereof seating in the recess 112 and the other end projecting into and abutting the closed end of the tube 117. The bracket 114 permanently mounts a guide pin 119 beneath the sleeve 109 in a position such that, during a stripping operation, the star wheel 111 will be required to retain its proper position.

As will hereinafter be more fully set out, the opening 107 is connected with a closed fluid line, and from the foregoing it is evident that if fluid under pressure enters the line 106, sleeve 109 will be moved from the position of Fig. 9 to that of Fig. 10, compressing spring 118. Such movement of the sleeve causes the star wheeel 111 also to move and, as indicated in these figures, the star wheel strips off the product mounted on a spit 82, causing such product to transfer to the inclined chute 22. It will be understood that this modification of the stripping mechanism is shown only in connection with one circular set of spits for the purpose of eliminating drawing duplication.

Referring more particularly to Figs. 12 and 18, another form of product stripping mechanism is shown. Herein brackets 121 mount opposite ends 122 of a compound screw 123. Midway between the brackets the screw fixedly mounts a gear 124 which, as suggested, meshes with a further gear 125 that, through suitable mechanism (not shown), is adapted to be rotated at will in either direction. Those portions of the screw immediately adjacent the gear 124 are smooth surfaced, as indicated at 126, and encircled by springs 127. Immediately adjacent the smooth portions, the screw is formed with undercut areas 128. From the undercut areas the screw includes reversely directed threads 129, these threads stopping short of the brackets 121 to provide smooth surfaced areas 131 on which are located springs 132. Each of the threaded portions 129 of the screw mounts a nut 133 which, with a collar 134, secures a star wheel 136. Each nut 133 also secures one end of a guide rod 137. The other end of this rod, when the parts are in the position of Fig. 12, projects into bracket 121. The purpose of the rod 137 is to prevent rotation of nut 133 when the compound screw 123 is rotated. As apparent from the drawings, each spring 127 urges the corresponding nut 133 toward and onto the adjacent threaded portion 129. When the screw 123 is rotated in one direction, nuts 133 move axially of this screw to the end of and beyond the threaded portion, compressing springs 132. This axial movement of the nut 133 serves to move the star wheel 136 in a direction to strip a product from a spit 82. Upon reversing the rotation of screw 123, springs 132 urge nuts 133 onto the threaded portions 129 and the star wheels are brought back to substantially the position shown in Fig. 12. The mechanism by which the direction of rotation of gear 124 is reversed is neither shown nor described, since it may be conventional structure and forms no specific part of the present invention.

In describing the operation of the device, reference will be had to the diagrammatic operating mechanism only for the purpose of illustrating one form of structure for actuating the various parts of the device in such timed and sequential relationship as to continuously produce cooked or otherwise thermally processed products from two or more initially separate ingredients. In the illustrated form, a paste-like ingredient is placed in the compartment 61 and a dough-like ingredient in compartment 62. The ingredient of compartment 61 is intended to constitute the filler of a two-ingredient product, and the ingredient in the compartment 62 is intended to serve as an edible jacket or wrapper. The switches 19 may be operated to energize the heating elements 103 and start operation of motor 24. Through reduction gearing, suggested by gears 29, 30, and 32, the motor 24 is adapted to rotate shafts 31 and 33 at extremely slow speeds. On shaft 31 is located a cam 140. This cam is operable to collapse a diaphragm 141 against tension of springs 142. In the process of collapsing this diaphragm, a companion diaphragm 143 is expanded due to their association through rods 145. As diaphragm 141 is collapsed, fluid previously contained therein is caused to flow through line 144 into diaphragm 146 (see Fig. 4), causing this diaphragm to expand and move rod 147 into the position shown in this figure. Rod 147, through bar 148, moves rod 149 in a direction to cause engagement of clutch 38. In this manner, gear 37 is rendered operative to drive gear 36 and shaft 34. Rotation of shaft 34 causes gear 39 to drive gears 41 and 42 in opposite directions. Since these last mentioned gears are mounted on the shafts of spiral blades 49 and 52, these blades rotate and cause the food ingredients in the compartments 61 and 62 to be extruded through nozzles 57 and 58. Due to the structure of nozzle 58 and its location with respect to nozzle 57, the paste-like ingredient, as it is extruded, is enclosed by a coating of the dough-like ingredient and these two ingredients, thus combined, move onto a spit 82 that is centered with the nozzle opening. It is mentioned at this point that, since shaft 31 revolves continuously during operation of the device, the spits 82 will be revolved through their belt connection with this shaft. However, during this period of loading a spit, the wheel 77 does not move.

Figure 7:
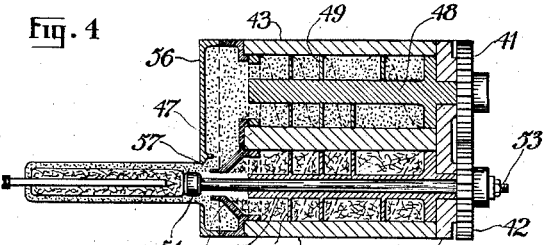
Fig. 7 is a fragmentary horizontal sectional view, taken through one of the extrusion units, and shows the food ingredients combined into a nearly completed product.
Figure 6:
Fig. 6 is a transverse sectional view of a somewhat differently contoured spit.
Figure 8:
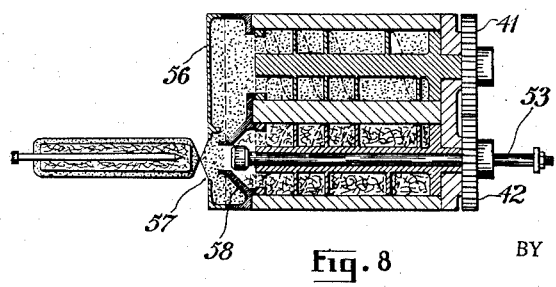
Fig. 8 is a view similar to Fig. 7 and the corresponding structure of Fig. 4, and shows a food product completely formed and mounted on one of the conveyor spits.
Figure 20:
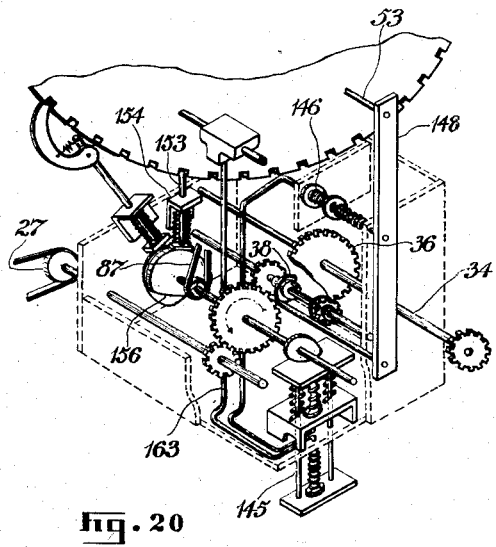
Fig. 20 is a view similar to Fig. 19, showing the position of the operative parts as the product forming operation is being completed and during disengagement of a formed product from its carrying spit (Figs. 9 and 10)
Figure 21:
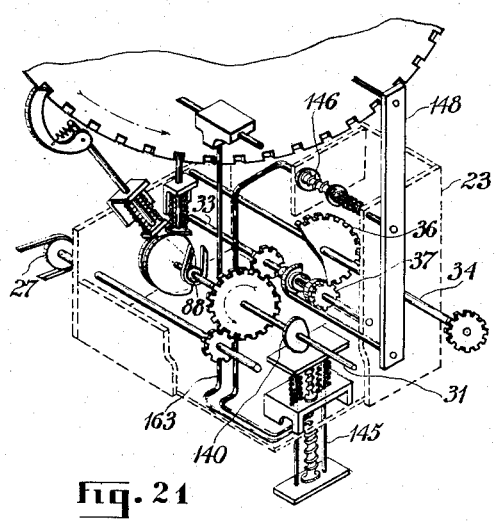
Fig. 21 is a further diagrammatic view, showing the position of the parts of the mechanism when the formed product is severed from the extruding unit (see Fig. 3)
Figure 22:
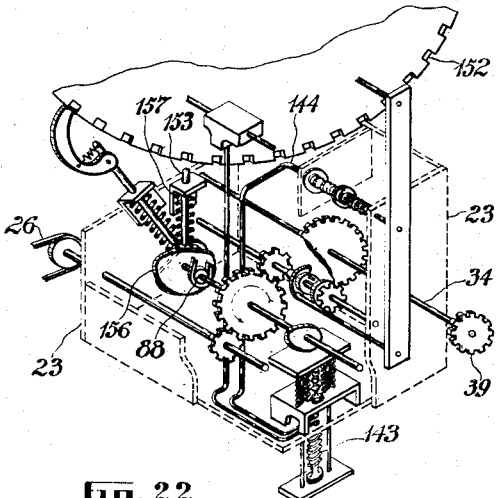
Fig. 22 is a diagrammatic view showing the position of the parts at the time the spit wheel is indexed to move a fresh spit into line with the extruding mechanism.

At a time when the ingredients have been combined and forced onto the spit to an extent suggested in Fig. 7, cam 140 has rotated sufficiently to allow diaphragm 141 to again fully expand under the impulse of springs 142. Thus diaphragm 146 will collapse under urging of spring 151, moving rods 147 and 149 in a manner to disengage clutch 38. The position of the operating mechanism at this point is shown in Fig. 20. It is pointed out that the push rod 53 is also attached to bar 148 and, consequently, as the clutch 38 is disengaged, the push rod moves through the tubular shaft 51 and the plunger 54, on the end thereof, functions to clear the nozzle 58 of the paste-like ingredient (see Fig. 7). Further operation of the mechanism causes another surface of cam 140 to present itself against the contact plate of the diaphragm 141 to partially collapse this diaphragm. This action causes fluid to partially expand diaphragm 146 and move the plunger from the position of Fig. 7 to that of Fig. 8. It will be understood, however, that the extent of movement at this point is insufficient to engage clutch 38 and cause further feeding of the ingredient through the nozzles. As the spit, on which the product has now been forced, continues to revolve, such motion twists the dough-like ingredient into a cone-like cap which serves to enclose the paste-like ingredient at this end of the product and facilitates subsequent severance of the dough at the cone's apex. The position of the parts of the mechanism, when the product has been completely formed on a spit and separated from the forming or extruding unit, is generally indicated in Fig. 21.

The next step in operation of the mechanism is to rotate the spit wheel 77 sufficiently to bring a fresh spit into a receiving position before the extruding unit. It will be noted that one of the flanges 78 of the spit wheel is formed with a series of uniformly distributed notches 152. During operation of the mechanism as described above, a pin 153 has been engaged with one of the notches 152 to hold the spit wheel against rotation such as would misalign a spit with respect to the nozzle 57. This pin projects through a guide bracket 154 and terminates in a shoe adapted to have pressure contact with a cam 156 by reason of a spring 157. Cam 156, as may be seen in the diagrammatic views, is mounted on and rotates with shaft 31. Adjacent cam 156, and also mounted on shaft 31, is a further cam 158. One end of a rod 159 is provided with a shoe which is caused to at all times contact cam 158 by reason of the action of a spring 161. This rod mounts a spring loaded pawl 162, the free end of which is engageable with any one of the notches 152 of the spit wheel 77. A comparison of Figs. 19 through 22 indicates that the shaft 31, in the present operating cycle, makes a one-half revolution during the process of forming and loading the product on a spit, and at the end of this procedure cam 156 has rotated to a position such that pin 153, under the impulse of spring 154, has withdrawn from a spit wheel notch 152. Examination of the pawl 162, as shown in Figs. 19 to 22, indicates that during this one-half revolution of shaft 31, cam 158, through rod 159, has caused this pawl to be extended to engage the next consecutive notch 152. During this movement, spring 161 has been compressed and, as cam 158 further rotates to present a low surface to the shoe of pin 159, spring 161 will, through expansion, move rod 159 and pawl 162 to an extent sufficient to rotate the spit wheel.

During a part of the above described operation, a further operation has taken place; namely, that of stripping a finished or cooked product from a spit. Comparison of Figs. 19 and 20 indicates that following the operation of loading the spit (as suggested in Fig. 19), cam 140 (as in Fig. 20) is rotated to permit action of springs 142 to expand diaphragm 141. As previously explained, when diaphragm 141 expands, diaphragm 143 contracts. Thus, with diaphragm 143 contracting, fluid contained therein will move through a line 163 into bracket 104, and thence outwardly through sleeves 109. The fluid pressure in this line is sufficient to move sleeves 109 from the position of Fig. 9 to that of Fig. 10 by reason of which the star wheel 111 is caused to strip the product from off its carrying spit. Again comparing the position of cam 140 in Figs. 20 and 21, it will be observed that this cam has rotated to compress diaphragm 141, thus expanding diaphragm 143. This action causes the fluid pressure to be withdrawn, or sufficiently decreased in line 163 to allow the expanding force of spring 118 to return the sleeve 109 to the position shown in Fig. 9 and, of course, during this movement, the star wheel 111 is returned to inoperative position preparatory to functioning to remove another product from the next succeeding spit. It will be understood that the spit from which a product has been stripped serves, as it leaves this area, to partially index wheel 111 and that the next succeeding spit completes this indexing.

Although the specific means for operating the modified stripping mechanism of Fig. 12 is neither shown nor described, it will be apparent that the diaphragm 143 could be eliminated and any suitable means connected with diaphragm 141 made effective to actuate the reversing switch of a motor which, being operatively connected with gear 125, would cause this stripping mechanism to function in proper time and sequence.

Particular attention is directed to the fact that the mechanism herein shown and described as being capable of combining two or more food ingredients into a product and for processing and discharging the product, may be modified in many respects such, for example, as number of food ingredients combined, processing with refrigeration instead of heat, and altering the cycle of operation or the time period of any of the various steps in the cycle. It will, therefore, be understood that the present disclosure, as well as the modifications mentioned, are considered as being within the spirit and scope of the invention insofar as such structure may be set out in the annexed claims.

Having thus set forth my invention, what I claim as new and for which I desire protection by Letters Patent is:

1. A device for producing a food product comprising at least two food ingredient containers, an endless conveyor in the form of a revolvable wheel, a plurality of uniformly spaced spits mounted on and extending away from the circumferential portion of said wheel, means operable to combine determined quantities of the food ingredients into food products and impale them on said spits, and means operable, following predetermined rotation of said wheel, to strip said products from said spits.

2. In a device for the successive producing of food products, a pair of containers adapted to contain different food ingredients, extruding means so associated with said containers as to be operable to combine the ingredients and form a product having a core of the one and jacket of the other ingredient, a revolvable wheel, spits for the food products on the circumference of said wheel, means for alternately revolving said wheel and actuating said extruding means whereby each product as formed may be impaled on a successive spit.

3. In a device for the continuous production of food products, at least two containers adapted to contain different food ingredients, extruding means so associated with said containers as to be operable to combine the ingredients and form a product having a jacket and core of different ingredients, an endless conveyor in the form of a revolvable wheel, spits on the circumferential edge of said wheel for empaling the products as they are formed by said extruding means, an enclosure for said wheel, and means in said enclosure for thermally processing said products.

4. In a device for the continuous production of food products, at least two containers adapted to contain different food ingredients, extruding means so associated with said containers as to be operable to combine the ingredients and form a product having a jacket and core of different ingredients, an endless conveyor in the form of a revolvable wheel, spits along the circumferential edge of said wheel for empaling the products as they are formed by said extruding means, an enclosure for said wheel, heating elements so located in said enclosure as to thermally process said products, and means operable, following the processing of each product, to strip the processed product from the spit on which it has been empaled.

5. A device for the manufacture and processing of food products from at least two food ingredients comprising suitable ingredient containers, an endless conveyor, a plurality of uniformly spaced supports on said conveyor, extruding means associated with and selectively operable to withdraw ingredients from said containers and force the formed products onto said conveyor supports, means for operating said conveyor to successively register supports with said extruding means, an enclosure for said conveyor having a discharge opening remote from said extruding means, and means operable to strip successive products from said supports as they approach said discharge opening.

6. A device for the manufacture and processing of food products formed from at least two food ingredients comprising an enclosure having a product discharge opening, an endless conveyor in said enclosure, a multiplicity of spits on said conveyor, containers for said food ingredients, an extruding unit associated with and operable to withdraw ingredients from said containers in a sufficient quantity to form a product, means for rotating said conveyor to register successive spits with the aperture of, and during each operation of said extruding unit whereby each product formed externally of said unit will be impaled on the registering spit, and further means for stripping successive products from said spits as said products approach said discharge opening.

7. A device for the manufacture and processing of food products formed from at least two food ingredients comprising an enclosure having a product discharge opening, an endless conveyor in said enclosure, a multiplicity of spits on said conveyor, containers for said food ingredients, an extruding unit associated with said containers, means for successively operating said extruding unit to withdraw predetermined quantities of ingredients from said containers to form products, further means for registering successive spits of said conveyor with the aperture of said extruding unit during each extruding operation whereby to impale each product formed externally of said unit on the registering spit, and other means for continuously rotating said spits at least during the operations of forming said products.

8. A device for the manufacture of food products formed from at least two food ingredients comprising an enclosure having a product discharge opening, an endless conveyor in said enclosure, a multiplicity of spits on said conveyor, containers for said food ingredients, an extruding unit associated with said containers, means for successively operating said extruding unit to withdraw predetermined quantities of ingredients from said containers to form products having single ingredient jackets, further means for registering successive spits of said conveyor with the aperture of said extruding unit during each successive extruding operation whereby to impale each product formed externally of said unit on the registering spit, other means operable to rotate said spits following each extruding operation whereby to produce a cone-like end to the ingredient forming the jacket of the product, and means for stripping successive products from said spits as said products approach said discharge opening.

9. In a device for the manufacture and processing of food products from at least two food ingredients, an endless conveyor, a multiplicity of spits on said conveyor, containers for said food ingredients, an extruding unit associated with said containers, said unit being operable to withdraw predetermined quantities of the ingredients from said containers and form exteriorly thereof a product having a core of one ingredient and a jacket of another ingredient, means for registering successive spits of said conveyor with the aperture of said extruding unit and for operating said extruding unit whereby each product as formed by said unit will be impaled on a registering spit, and other means for continuously rotating said spits whereby, when said extruding unit is rendered inoperative, the ingredient constituting the jacket of the formed product will be twisted to form a cone-like end to enclose the core element.

10. In a device for the manufacture and processing of food products from at least two food ingredients, an endless conveyor, a multiplicity of spits on said conveyor, containers for said food ingredients, an extruding unit associated with said containers, means for successively operating said extruding unit to withdraw ingredients from said containers to form a product consisting of a core of one ingredient and jacket of the other ingredient, means within said unit operable on the completion of an extruding operation to sever the core ingredient from said unit, means operable to move said conveyor to register successive spits with the aperture of said unit, and other means operable to effect successively the operation of extruding a product, severing the core ingredient from said unit, and movement of said conveyor.

11. In a device for the manufacture and processing of food products from at least two food ingredients, an endless conveyor, a multiplicity of spits on said conveyor, containers for said food ingredients, an extruding unit associated with said containers, means for successively operating said extruding unit to withdraw ingredients from said containers to form a product consisting of a core of one ingredient and jacket of the other ingredient, means within said unit operable on the completion of an extruding operation to sever the core ingredient from said unit, means operable to move said conveyor to register successive spits with the aperture of said unit, and further means for continuously rotating said spits, said further means, on the completion of each extrusion operation, being effective to twist the jacket ingredient to produce a cone-like end and sever said ingredient from that remaining in the aperture of said extruding unit.

12. In a device for the manufacture of food products from two food ingredients having two food ingredient containers and an extruding unit for forming the ingredients into food products consisting of a jacket of one ingredient and a core of the other ingredient, an endless conveyor, a plurality of spits on said conveyor, a product stripper, mechanism operable to register a spit with the opening in said unit, actuate said unit to impale a product on said spit, rotate said spit to sever the jacket ingredient from said unit, and move said stripper to disengage said product from said spit.

13. In a device for the manufacture of food products from two food ingredients having two food ingredient containers and an extruding unit for forming the ingredients into food products consisting of a jacket of one ingredient and a core of the other ingredient, an endless conveyor, a plurality of spits on said conveyor, a product stripper, mechanism operable to register a spit with the opening in said unit, actuate said unit to impale a product on said spit, rotate said spit to sever the jacket ingredient from said unit, and move said stripper to disengage said product from said spit, each product, when disengaged from its carrying spit, having a lengthwise aperture corresponding in contour and length to said spit and providing an opening from the exterior of the product to the interior of the core ingredient.

14. In a device for the continuous production of food products, at least two containers adapted to contain different food ingredients, extruding means so associated with said containers as to be operable to combine the ingredients to form a product having a jacket and core of different ingredients, means for supporting each product as formed by said extruding means, and means for effecting relative movement of said extruding means and said supporting means whereby successively formed products are successively receivable on said supporting means.

15. A device for producing a food product comprising at least two ingredient containers, an endless conveyor, a series of spaced apart spits on said conveyor, means operable to combine predetermined quantities of food ingredients into food products and force them into empaled relationship with said spits, and other means operable to strip successively presented products from said spits and in a manner to retain the opening in said product formed by said spit.

16. A device for the manufacture of a food product formed from at least two food ingredients comprising ingredient containers, an endless conveyor, a plurality of product supports on said conveyor, extruding means associated with and operable to force said ingredients from said containers, form said ingredients into a product and impale said product on one of said supports, means for successively registering said supports with said extruding means, and further means operable to disengage each product from its support following a processing operation.

JOHN J. KRANTZ.

REFERENCES CITED

The following references are of record in the file of this patent:

UNITED STATES PATENTS

| Number | Name | Date |
|---|---|---|
| 651,829 | Copland | June 19, 1900 |
| 1,391,268 | O'Brien | Sept. 20, 1921 |
| 1,597,979 | James et al. | Aug. 31, 1926 |
| 1,716,266 | Flamm | June 4, 1929 |
| 1,781,411 | Reiber | Nov. 11, 1930 |
| 1,933,557 | Kalvin | Nov. 7, 1933 |
| 2,139,690 | McConnell et al. | Dec. 13, 1933 |
| 2,193,147 | Stricker | Mar. 12, 1940 |

FOREIGN PATENTS

| Number | Country | Date |
|---|---|---|
| 11,008 | Great Britain | May 26, 1905 |